L. I. REICHNER.
JUICE EXTRACTOR.
APPLICATION FILED APR. 26, 1915.
1,168,032.
Patented Jan. 11, 1916.
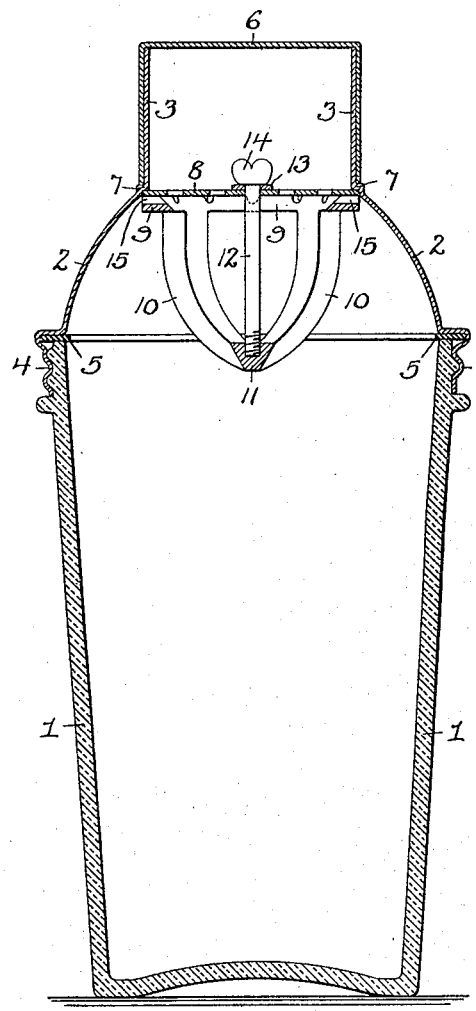
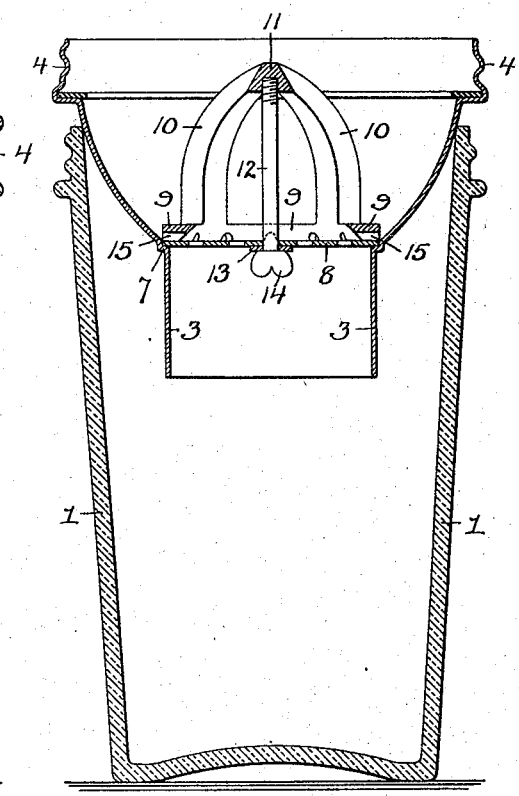
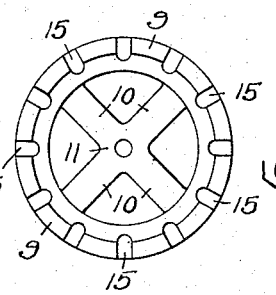
WITNESSES
INVENTOR
LOUIS IRVING REICHNER
BY HIS ATTORNEY

UNITED STATES PATENT OFFICE.

LOUIS IRVING REICHNER, OF ATLANTIC CITY, NEW JERSEY.

JUICE-EXTRACTOR.

1,168,032.  Specification of Letters Patent.  Patented Jan. 11, 1916.

Application filed April 26, 1915. Serial No. 23,878.

*To all whom it may concern:*

Be it known that I, LOUIS IRVING REICHNER, a citizen of the United States, residing in Atlantic City, New Jersey, have invented certain Improvements in Juice-Extractors, of which the following is a specification.

My invention consists of certain improvements in the liquid mixer, shaker and juice extractor constituting the subject of my Letters Patent No. 1,075,119, dated October 7, 1913, the object of my present invention being to simplify and cheapen the construction of the juice extractor and to insure the delivery into the mixing vessel of all of the juice resulting from the action of said extractor.

In the accompanying drawing Figure 1 is a sectional view of the parts of the device in their first position as when being used as a juice extractor; Fig. 2 is a similar view of the parts in the position assumed by them when the device is being used as a mixer, and Fig. 3 is a bottom view of the juice extractor detached from the other parts of the device.

In the drawing, 1 represents the mixing vessel which is preferably of glass in tumbler form, and 2 represents a dome-shaped cap therefor having at the top a contracted neck 3 and at the base a projecting flange 4 which may be either threaded for engaging a thread at the top of the vessel 1 or may be plain for fitting over an unthreaded portion of said vessel, said cap preferably carrying a packing ring 5 for insuring a liquid-tight closure of the vessel 1 when the cap is applied thereto, as shown in Fig. 2. When used as a mixer the contracted neck 3 at the top of the cap 2 is closed by a cover 6 in the form of an inverted cup.

At the junction of the dome-shaped portion of the cap and contracted neck 3 is an internal shoulder 7, against which bears a perforated strainer plate 8, which is preferably secured to said shoulder 7, and upon said strainer plate bears the base 9 of the juice extractor, said base in the present instance, being in the form of a ring, from one side of which project a series of converging arms 10 meeting in a crown block 11 which has an internally threaded opening for the reception of the threaded end of a screw stem 12, the latter passing through a central opening in the strainer 8 and a washer 13 and having a head 14 whereby it can be readily turned so as to confine the base of the extractor to the strainer plate or release it therefrom if desired. In that portion of the base ring 9 of the extractor which bears against the strainer plate 8 are a series of radial recesses 15 which, when the parts are in the position shown in Fig. 1 and the extractor is being used, serve to prevent accumulation of juices in the space between the periphery of the base ring 9 and the inner face of the dome-shaped cap 2, all of the extracted juice therefore entering the receptacle 1.

By reason of the elimination of the bridge bar extending diametrically across the interior of the ring shaped base of the extractor shown in my former patent, I am enabled to materially simplify the operation of die casting the extractor and thereby reduce the cost of the same without any impairment of its efficiency, and by providing drainage openings in the base ring 9 I prevent the waste of juice which occurs when a solid base ring is employed.

The juice extractor may remain in place when the parts are in the position shown in Fig. 2 and the device is being used as a shaker, or said extractor may be detached from the strainer 8 if desired when the strainer is soldered or otherwise secured in position in the cap 2, or, if the strainer is not thus secured in position, both strainer and extractor may be removed when the device is being used as a shaker, or the cap 2 may simply serve as a carrier for the extractor and strainer and a separate cap may be applied to the vessel 1 when the latter is being used as a shaker.

I claim:

1. A juice extractor consisting of a base ring having an unobstructed opening therethrough and converging arms projecting therefrom, and integral therewith.

2. A juice extractor consisting of a base ring having an unobstructed opening therethrough and converging arms projecting therefrom and integral therewith, a crown block, a support for the base ring of the extractor, and means for connecting said crown block and support.

3. A juice extractor consisting of a base ring having an unobstructed opening therethrough and converging arms projecting therefrom and integral therewith, a crown block having a threaded opening therein, a support for the base ring of the extractor, and a screw stem having a head for engaging said support, and a threaded portion for engaging the threaded opening in the crown block.

4. A juice extractor comprising a base ring having drainage recesses in the under face of the same and converging arms projecting therefrom and integral therewith, and a support for said base ring.

In testimony whereof, I have signed my name to this specification, in the presence of two subscribing witnesses.

LOUIS IRVING REICHNER.

Witnesses:
KATE A. BEADLE,
HAMILTON D. TURNER.

Copies of this patent may be obtained for five cents each, by addressing the "Commissioner of Patents Washington, D. C."